(12) United States Patent
Nakatani et al.

(10) Patent No.: US 7,574,557 B2
(45) Date of Patent: Aug. 11, 2009

(54) UPDATED DATA WRITE METHOD USING JOURNAL LOG

(75) Inventors: Yoji Nakatani, Yamato (JP); Koji Sonoda, Sagamihara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/385,792

(22) Filed: Mar. 22, 2006

(65) Prior Publication Data

US 2006/0161731 A1 Jul. 20, 2006

Related U.S. Application Data (63) Continuation of application No. 10/366,361, filed on Feb. 14, 2003, now Pat. No. 7,047,355.

(30) Foreign Application Priority Data

Dec. 4, 2002 (JP) ............................ 2002-351929

(51) Int. Cl.
G06F 12/00 (2006.01)
(52) U.S. Cl. ...................... 711/113; 707/201
(58) Field of Classification Search ................ 711/113, 711/111, 112, 114; 714/106, 1, 2; 707/201
See application file for complete search history.

(56) References Cited

U.S. PATENT DOCUMENTS

| | | | |
|---|---|---|---|
| 5,163,131 A | 11/1992 | Row et al. | |
| 5,412,801 A | 5/1995 | de Remer et al. | |
| 5,446,861 A * | 8/1995 | Idleman et al. | 711/100 |
| 5,555,389 A | 9/1996 | Satoh et al. | |
| 5,778,168 A | 7/1998 | Fuller | |
| 5,832,515 A | 11/1998 | Ledain et al. | |
| 5,896,492 A | 4/1999 | Chong, Jr. | |
| 6,052,695 A * | 4/2000 | Abe et al. | 707/202 |
| 6,144,999 A | 11/2000 | Khalidi et al. | |
| 6,345,368 B1 | 2/2002 | Bergsten | |
| 6,516,380 B2 | 2/2003 | Kenchammana-Hoskote et al. | |
| 6,526,418 B1 | 2/2003 | Midgley et al. | |
| 6,622,152 B1 | 9/2003 | Sinn et al. | |
| 6,721,765 B2 | 4/2004 | Ghosh et al. | |

(Continued)

FOREIGN PATENT DOCUMENTS

JP 09-114718 4/1997

(Continued)

OTHER PUBLICATIONS

Daniels, D. et al, "Distributed Logging for Transaction Processing", Proceedings of the 1987 ACM SIGMOD International Conference on Management of Data, 1987, pp. 82-96.

(Continued)

*Primary Examiner*—Kevin L Ellis
*Assistant Examiner*—Jared I Rutz
(74) *Attorney, Agent, or Firm*—Brundidge & Stanger, P.C.

(57) ABSTRACT

A problem with a journaling file system is that the load on input/output processing executed between a server and a storage system is increased because a journal log is written when the file system is updated and updated data is written when flush processing is executed. In a system according to the present invention, a storage system that has received journal logs from a server uses updated data included in the journal logs to execute flush processing.

5 Claims, 8 Drawing Sheets

U.S. PATENT DOCUMENTS

| | | |
|---|---|---|
| 6,732,124 B1 | 5/2004 | Koseki et al. |
| 6,761,705 B1 | 7/2004 | Chiu |
| 6,829,610 B1 * | 12/2004 | Hickman et al. ............... 707/10 |
| 2002/0152195 A1 | 10/2002 | Bills et al. |
| 2003/0033383 A1 | 2/2003 | Elnozahy et al. |
| 2003/0163652 A1 | 8/2003 | Tsuge |
| 2003/0187885 A1 | 10/2003 | Miyazaki et al. |
| 2003/0195903 A1 | 10/2003 | Manley et al. |
| 2003/0221075 A1 | 11/2003 | Achiwa et al. |
| 2003/0225898 A1 | 12/2003 | Saika et al. |
| 2003/0236944 A1 | 12/2003 | Thompson, Jr. et al. |
| 2004/0024977 A1 * | 2/2004 | Delaney et al. ............. 711/154 |
| 2004/0059738 A1 | 3/2004 | Tarbell |
| 2004/0059869 A1 | 3/2004 | Orsley |
| 2004/0078508 A1 | 4/2004 | Rivard |
| 2004/0107318 A1 | 6/2004 | Bono et al. |

OTHER PUBLICATIONS

JFS overview, IBM, Feb. 25, 2000.
JFS Log.
xFS Project Architecture, Oct. 8, 1993.
xFS Transaction Mechanism, Oct. 7, 1993.
The Log Manager (xLM), Mar. 28, 1994.

* cited by examiner

| COMMAND NAME | PARAMETER | DATA | ISSUED BY: | |
|---|---|---|---|---|
| log-write | LU NUMBER, LOG SIZE, NUMBER OF ITEMS | LOG DATA | SERVER | 61 |
| flush | LU NUMBER | (NONE) | SERVER | 62 |
| flush-done | LU NUMBER | (NONE) | DISK DEVICE SYSTEM | 63 |

FIG. 5

| bit<br>byte | 7 | 6 | 5 | 4 | 3 | 2 | 1 | 0 | |
|---|---|---|---|---|---|---|---|---|---|
| 0 | (OPERATION CODE) = 0AH |||||||| ⎯71 |
| 1 | (LU NUMBER) ||| ⎯72 ||||| |
| 2 | (LOGICAL BLOCK ADDRESS) = NOT SPECIFIED |||||||| ⎯73 |
| 3 | |||||||| |
| 4 | (NUMBER OF TRANSFER BLOCKS) =<br>NUMBER OF LOG BLOCKS |||||||| ⎯74 |
| 5 | (CONTROL BYTE) = E0H |||||||| ⎯75 |

UPDATED DATA WRITE METHOD USING JOURNAL LOG

This is a continuation application of U.S. Ser. No. 10/366,361, filed Feb. 14, 2003 now U.S. Pat. No. 7,047,355.

BACKGROUND OF THE INVENTION

The present invention relates to a journaling file system that stores the update history of files stored on a disk drive in a storage system to prepare against a server failure.

A server that manages files stored on the disk drive of a storage system and that processes requests to access those files uses a buffer memory, a part of memory provided on the server, to reduce the number of input/output operations executed for the storage system and to reduce the response time of access requests. The server reads data from the disk drive for temporarily storing it in the buffer memory of the server and, upon receiving an access request to the file, processes the access request using data stored in the buffer memory without accessing the storage system.

The problem with this method is that, if the server fails due to a failure such as a power failure after updating data only in the buffer memory in response to an update request, the contents of the file updated in the buffer are lost. As a result, there is a possibility that an inconsistency problem will develop in the file system that is maintained by the server though the execution of the file management program. To solve this problem, some journaling file systems are introduced at the sites given below:

1 "xFS Project Architecture 10.0" at http://linux-xfs.sgi.com/projects/xfs/design_docs/xfsdocs93_pdf/arch.pdf
2 "xFS Transaction Mechanism 2.1, 4.3, 4.4, 4.5" at http://linux-xfs.sgi.com/projects/xfs/design_docs/xfsdocs93_pdf/trans.pdf
3 "The Log Manager 3.0" at http://linux-xfs.sgi.com/projects/xfs/design_docs/xfsdocs93_pdf/log_mgr.pdf
4 "JFS overview" at ftp://www6.software.ibm.com/software/developer/library/jfs.pdf
5 "JFS log" at http://oss.software.ibm.com/developer/opensource/jfs/project/pub/jfslog/jfslog.pdf When the server receives a file update request, the journaling file system updates data in the buffer and, at the same time, creates a journal log in which update contents are recorded. The journal log is written in the journal log storing area on the disk drive before the server returns a response to the update request to prevent the journal log from being lost even if the server fails. On the other hand, updated data in the buffer, which is managed by the journaling file system as dirty data, is written on the disk drive after the server returns a response to the update request. In the description below, updating data stored on the disk device is called flush processing. In case a failure occurs in the server, the server reads the journal log from the storage system and repairs the file system using the journal log.

SUMMARY OF THE INVENTION

When the contents of a file are updated in a journaling file system, the journal log is written on, and flush processing is executed for, for the disk drive at different times. This increases the data transfer load on the server and the storage system.

In view of this, the present invention provides a server and a storage system that efficiently write journal logs and execute flush processing. To implement this, the storage system that receives a journal log from the server uses updated data included in the journal log to execute flush processing.

Other objects, features and advantages of the invention will become apparent from the following description of the embodiments of the invention taken in conjunction with the accompanying drawings.

DESCRIPTION OF THE EMBODIMENTS

Some embodiments of the present invention will be described below. It should be noted that those embodiments do not limit the scope of the present invention.

Figure 1:
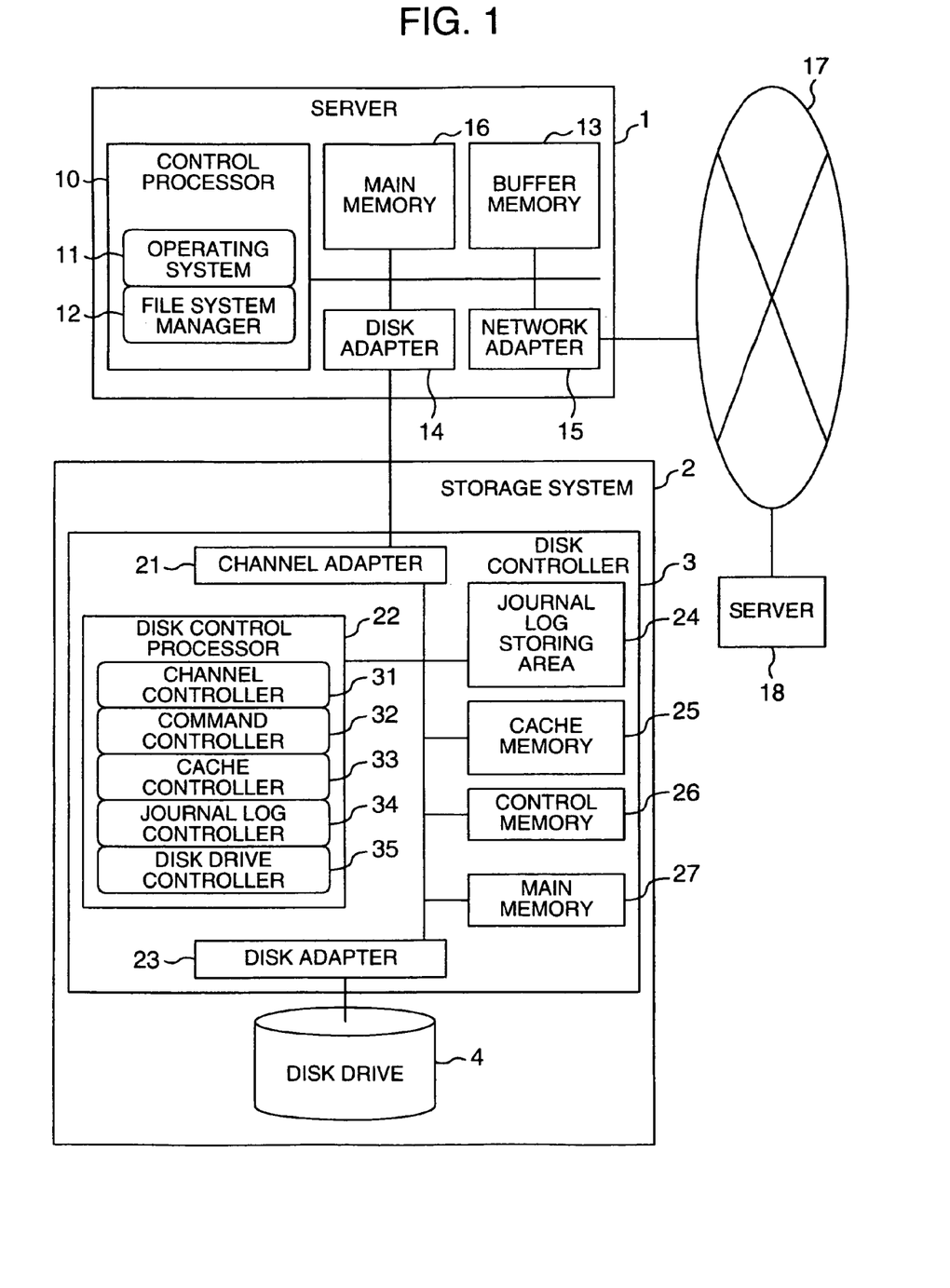
FIG. 1 is a diagram showing the configuration of a system to which the present invention is applied.

FIG. 1 is a diagram showing an example of the configuration of a system to which the present invention is applied. The system comprises a server 1 and a storage system 2 connected to the server 1. The server 1 and the storage system 2 may be separate devices connected via a communication path, or the server 1 and storage system 2 may be stored in one cabinet to form one integral device in which both are connected via a communication path within the device (cabinet).

The server 1 is a computer comprising a control processor 10, a buffer memory 13 in which file system management information and data read from a disk drive 4 of the storage system 2 are stored, a disk adapter 14 connected to the storage system 2 for data transfer to or from the storage system 2, a network adapter 15 connected to a network 17 for controlling communication with other servers 18 on the network, and a main memory 16 in which programs to be executed by the control processor 10 are stored, all interconnected by internal communication lines such as a bus.

The server 1 further comprises an operating system 11 that controls the entire resources of the server 1 and a file system manager 12 that manages the files stored on the disk drive 4 of the storage system 2. The operating system 11 and the file system manager 12 are implemented by the control processor 10 executing programs stored in the main memory 16. The server 1 further comprises input devices (not shown) such as a keyboard and a mouse as well as output devices (not shown) such as a display.

The storage system 2 comprises the disk drive 4 on which data is stored and a disk controller 3 that receives a request to access storage areas on the disk drive 4 from the server 1 for controlling the input/output of data to or from the disk drive 4.

The disk controller 3 comprises a channel adapter 21 that sends or receives data to or from the server 1, a journal log storing area 24 that is a memory in which journal logs received from the server 1 are stored, a cache memory 25 in which data written by the server 1 or data read from the disk drive 4 is stored, a main memory 27 in which the programs to be executed by a disk control processor 22 are stored, a control memory 26 in which control information used by controllers that will be described later is stored, a disk adapter 23 that sends or receives data to or from the disk drive 4, and the disk control processor 22 that controls the components described above.

The disk controller 3 further comprises a channel controller 31 that controls data transmission and reception between the server 1 and the cache memory 25 and between the server 1 and the journal log storing area 24 both via the channel adapter 21, a command controller 32 that interprets a request received from the server 1 and issues a processing request to the controllers according to the request contents, a cache controller 33 that judges if data is present in the cache memory 25 and manages the cache memory 25, a journal log controller 34 that manages the journal log storing area 24 and writes updated data 57 in the cache memory 25 using the contents of a journal log, and a disk drive controller 35 that controls data transmission and reception between the cache memory 25 and the disk drive 4 via a disk adapter 23. The channel controller 31, command controller 32, cache memory controller 33, journal log controller 34, and disk drive controller 35 are implemented by the disk control processor 22 executing the programs stored in the main memory 27.

The disk control processor 22 may be composed of a plurality of processors. When the disk control processor 22 is composed of a plurality of processors, each processor may be configured to execute any processing and control or may be assigned to execute specific programs, processing, and control contents. For example, a processor dedicated to the journal log controller 34 may be provided.

The cache memory 25, control memory 26, and journal log storing area 24, each configured by a battery-operated nonvolatile memory, retain data even if the external power is disconnected because of a failure. Although the cache memory 25 and the journal log storing area 24 are shown separately in FIG. 1, a part of the area of the cache memory 25 may be used as the journal log storing area 24. Furthermore, if the journal log controller 34 manages a journal log separately from ordinary data in the cache memory 25, no special area need be provided as the journal log storing area 24.

The disk drive 4, a recording medium such as a magnetic storage medium, may be not only a single disk drive but also a plurality of disk drives such as a RAID (Redundant Arrays of Inexpensive Disks) type disk array. The storage area in the recording medium is divided into a plurality of fixed-length blocks, for example, 512 byte blocks, and the disk controller 3 can uniquely specify the storage location of data by specifying a block using its block address. The disk drive 4 stores user data that is the contents of a file as well as meta data that is the management data used by the file system. Meta data includes information such as information on file sizes or file system directory structure, information on a file location within the directory structure, and so on. When accessing user data or meta data stored on the disk drive 4, the file system manager 12 issues an access request to the disk controller 3 with a block address specified. The disk drive controller 35 of the disk controller 3 accesses a storage area on the disk drive 4 using a block address received from the server.

Figure 9:
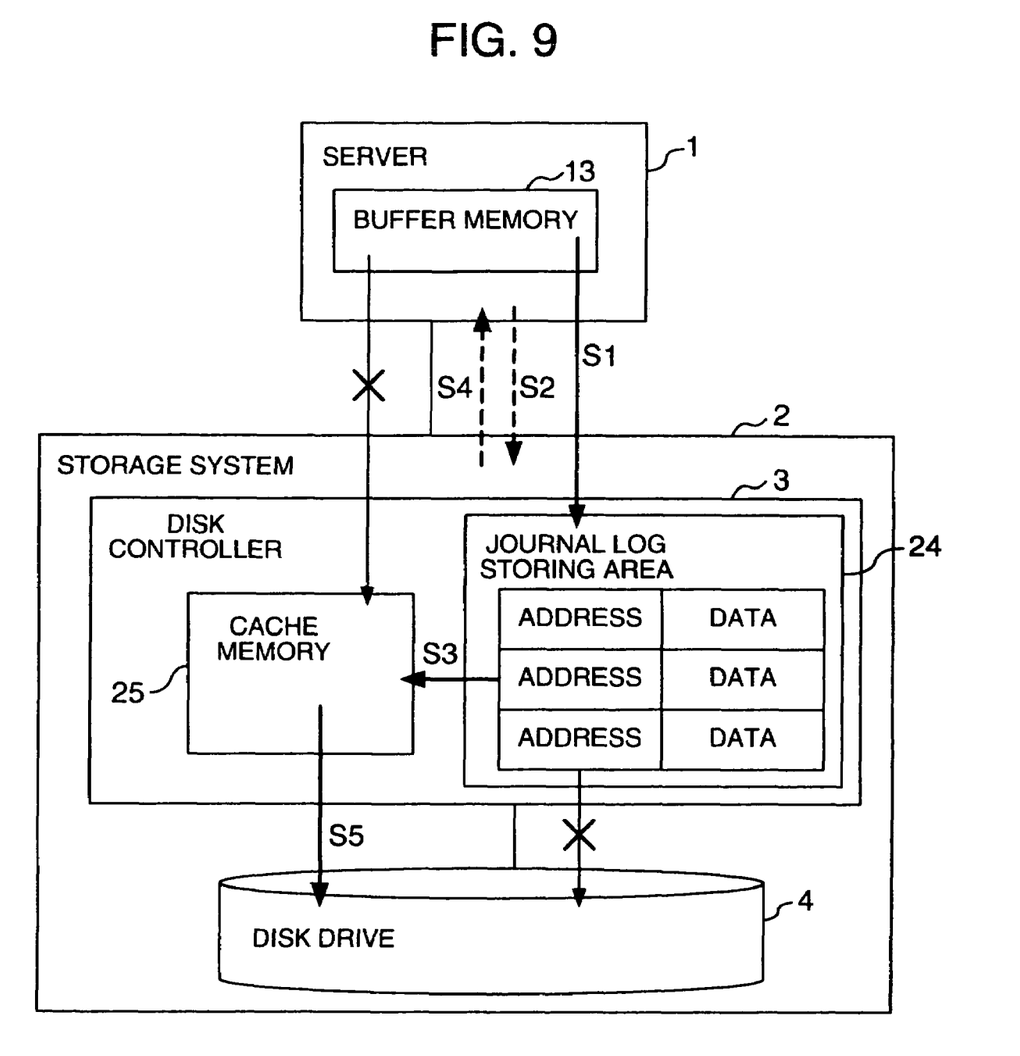
FIG. 9 is a diagram showing an example of journal log write processing and flush processing.

Next, with reference to FIG. 9, the following outlines journal log write processing and flush processing in this embodiment. When the server 1 receives a request to update a file, which is stored in the storage system 2, from some other server 18 on the network 17 via the network adapter 15 or from a user of the server 1 via an input device, the file system manager 12 receives this update request via the operating system 11. In response to the update request, the file system manager 12 updates data in the buffer memory 13 of the server 1 and manages the updated data as dirty data. At the same time, the file system manager 12 creates a journal log that is history information on file updating executed in the buffer memory 13 and sends the created journal log to the storage system 2 (S1). The journal log is written in the nonvolatile journal log storing area 24 in the storage system 2 under control of the journal log controller 34.

Conventionally, the disk controller 3 cannot distinguish between an input/output request sent from the server 1 for writing a journal log and an input/output request for writing ordinary data. Therefore, in response to an input/output request for writing data from the server 1, the disk controller 3 once stores the write data in the cache memory 25 of the disk controller 3 whether the data is a journal log or ordinary data and then writes it on the disk drive 4. On the other hand, in the method in this embodiment that will be described later, the disk controller 3 can distinguish between an input/output request for writing a journal log and an input/output request for writing ordinary data. Therefore, if data received from the server is identified as a journal log as a result of checking the type of an input/output request received from the server, the disk controller 3 does not write the received data on the disk drive 4 but stores the received data in the journal log storing area 24 of the disk controller 3.

When the server 1 requests that data updated in the buffer memory 13 be updated also in the storage area in the storage system 2, the file system manager 12 issues a file update request (flush request) to the storage system 2 (S2). The flush request need not be issued at the same time the input/output request for writing the journal log is issued. Until data in the storage area in the storage system 2 is updated, the file system manager 12 connects (queues) the data updated in the buffer memory 13 to the dirty queue for managing it as dirty data.

Dirty data must be stored in the buffer memory 13 until data identical to the dirty data is written in the storage system 2 and the data is updated in the storage area in the storage system 2. Therefore, the file system manager 12 manages the storage area in the buffer memory 13 where dirty data is stored so that the area will not be used as a storage area for other data until flush processing is executed. When the server 1 receives a request to access dirty data from some other server 18 or from a user of the server 1, the file system manager 12 uses dirty data stored in the buffer memory 13 to process the access request to prevent old data, which is not yet updated, from being read from the storage system 2.

Conventionally, when the server 1 issues a flush request (S2), updated data (dirty data) stored in the buffer memory 13 in the server 1 is transferred to the storage system 2, the transferred data is once stored in the cache memory in the disk controller 3 under control of the cache memory controller 33, and then the data is stored on the disk drive under control of the disk drive controller 35. On the other hand, in this embodiment, the journal log controller 34 and the disk drive controller 35 use updated data already stored in the journal log storing area 24 as a journal log to execute flush processing.

First, in response to a flush request from the server (S2), the journal log controller 34 of the disk controller 3 reads updated data from the journal log storing area into the cache memory 25 (S3) and, upon completion of read processing, the disk controller 3 sends a flush processing completion notification to the server 1 (S4). After that, the disk drive controller 35 writes the updated data, which is read into the cache memory 25, to the disk drive 4 (S5).

When the disk controller 3 receives a data read request from the server 1, the disk controller 3 checks the address information included in the read request to see if data that is stored in the storage area on the disk drive indicated by the address information or data that will be stored in the storage area has been read into the cache memory 25. If the read request received from the server is a request to read data read from the cache memory 25 in S3, the disk controller 3 sends the data from the cache memory 25 to the server 1. If the read request is a request to read data not yet read into the cache memory 25, the disk controller 3 reads the data from the disk drive 4 to the cache memory and then sends the data to the server 1.

As a result, this embodiment eliminates the need for the server 1 to transfer updated data to the storage system 2 at a flush request time, reducing the data transfer load on the server 1 and the storage system 2. The journal log controller 34 may also read updated data from the journal log storing area into the cache memory 25 before receiving a flush request from the server. In this case, because updated data is already read into the cache memory 25 when the disk controller 3 receives a flush request, the disk controller 3 may immediately send a flush processing completion notification to the server 1.

When the server 1 receives the flush processing completion notification from the storage system 2, the file system manager 12 dequeues the dirty data, which is stored in the buffer memory of the server 1, from the dirty queue. As a result, the storage area in the buffer memory 13 where the dirty data has been stored is released for use in storing other data.

If a failure such as a power failure occurs in the server 1 after a journal log is written but before a flush request is issued, the file system manager 12 of the server 1 is able to recover the file system by using the journal log stored in the journal log storing area 24.

Figure 2:
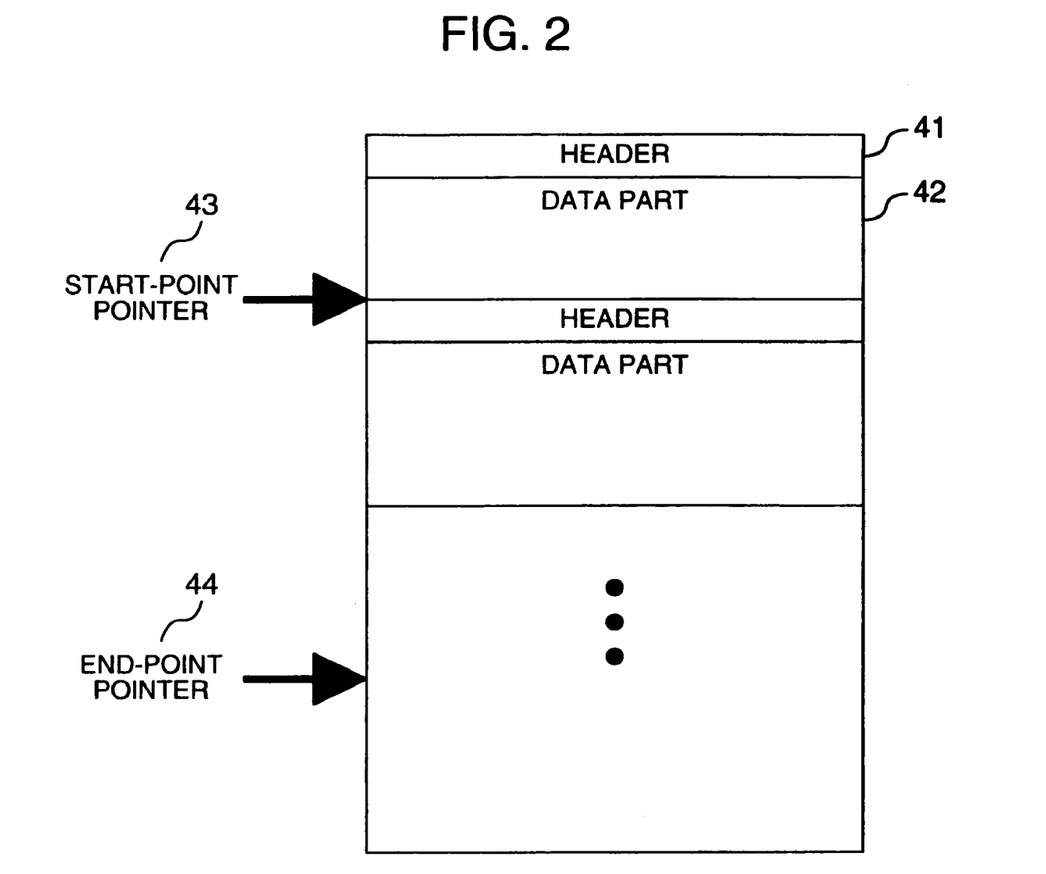
FIG. 2 is a diagram showing an example of the format of a journal log storing area.

FIG. 2 is a diagram showing an example of the structure of data stored in the journal log storing area 24. The journal log storing area 24 contains a plurality of journal logs in the order they are received from the server 1. The journal log storing area 24 is wrapped; that is, the area, when used up, is reused beginning at the start.

When the server 1 receives a request to update a file, the file system manager 12 updates data in the buffer memory, creates a journal log, and sends the journal log to the disk controller 3 as described above. Therefore, in the storage system 2, the journal log is first written in the journal log storing area 24. After that, data is updated in the cache memory 25 of the storage system 2 in the same way the data was updated in the buffer memory 13 of the server 1 and then the updated data is written on the disk drive 4. Therefore, in some cases, even after a journal log is written in the journal log storing area 24, data may not yet be updated in the storage system 2. In such a case, the journal log is called an un-reflected journal log because the updated contents of the file in the journal log are not yet reflected in the storage system 2.

To identify an area within the journal log storing area 24 where un-reflected journal logs are stored, the journal log controller 34 uses two pointers: a start-point pointer 43 and an end-point pointer 44. The area between the position pointed to by the start-point pointer 43 and the position pointed to by the end-point pointer 44 (or, when the start-point pointer points to a position that is after a position pointed to by the end-point pointer, the area from the position pointed to by the start-point pointer to the end of the journal log storing area and from the start of the journal log storing area to the position pointed to by the end-point pointer) is an area where un-reflected journal logs are stored. The start-point pointer 43 and the end-point pointer 44 are stored in the control memory 26 for management by the journal log controller 34. The file system manager 12 running in the server 1 has two pointers corresponding to those two pointers in the buffer memory 13 and, when a journal log is created or a flush processing completion notification is received, updates the values of the two pointers to manage the status of the journal log storing area 24. This configuration eliminates the need for the file system manager 12 of the server 1 to issue a pointer read request to the storage system 2 to manage the free space in the journal log storing area 24.

Each journal log has a header 41 and a data part 42. The data part 42 is variable in length with the length (in bytes) of the data part 42 stored in the header 41. The data part contains user data that is written to a file in response to a file update request received by the server and file system management information (meta data) that is changed in response to an update request. Journal logs are created, one for each file update request received by the server 1 from a user of the server 1 or from other servers 18.

Two types of data is updated by a file update request; one is meta data that is management information used by the file system and the other is user data that :s the contents of a file. Therefore, a journal log is created in one of two methods, either for the update of both meta data and user data or for the update of only one of meta data and user data. The journaling system in this embodiment may be applied to both methods. To include the update history of both meta data and user data into a journal log, the server 1 writes a journal log in the storage system 2 in response to a file update request and manages dirty data according to the update of each of meta data and user data. To include only the update history of meta data into a journal log, the server 1 writes a journal log indicating the update of meta data in response to a file update request and user data updated in the buffer memory 13 into the storage system 2 and manages dirty data according to the update of meta data.

Figure 3:
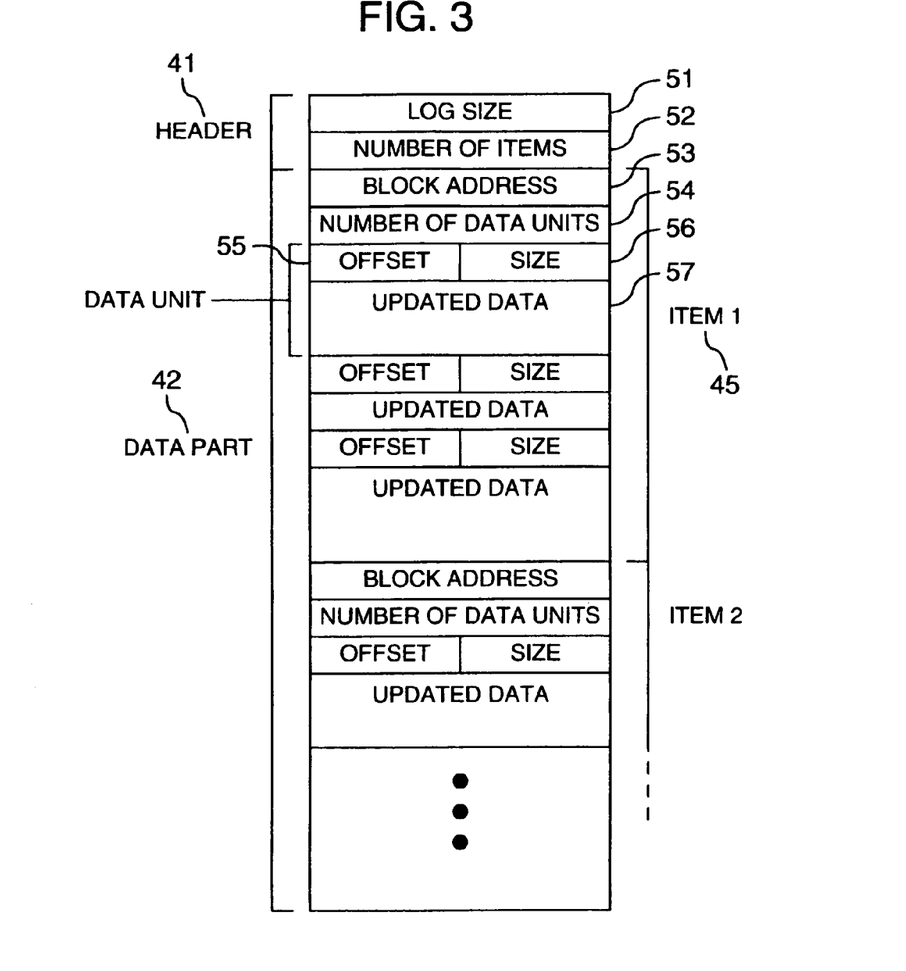
FIG. 3 is a diagram showing an example of the format of a journal log.

FIG. 3 is a diagram showing an example of the data format of a journal log in this embodiment. The header 41 of the journal log, fixed in length, includes a log size 51 indicating the size of the journal log and a number of items 52 indicating the number of items 45 each of which is a group of update contents included in the journal log.

The data part 42 contains the number of items 45 indicated by the header, each item having its own area. Each item 45 is composed of a block address 53 of a storage area on the disk drive 4 representing the storage area on disk drive 4 whose update history is represented by the information in the item, a number of data units 54 indicating how many data units are included, and one or more data units. A data unit, variable in length, contains an offset 55 indicating a position relative to the block address 53 of the storage area on the disk drive 4 in which updated data 57 is to be stored, a size 56 indicating the data amount of the updated data 57, and the updated data 57.

Updated data contained in one item is stored in a consecutive storage area on the disk drive. When the storage area on the disk drive 4 where updated data is to be stored extends across two or more consecutive blocks, the block address 53 indicates a position within the first block. The offset 55 may take a value exceeding the block size. When the offset 55 exceeds the block size, the offset 55 indicates a position within the block that follows the first block. That is, the value obtained by subtracting the block size from the offset 55 indicates a position within the block that follows the first block, and the updated data stored in the same data unit in which the offset information is stored is stored on the disk drive 4 beginning at the position indicated by the offset. An offset exceeding two or more block sizes indicates a position within a block that follows those blocks.

A conventional journal log does not include a block address. This is because a block address need not be included in the journal log which has been conventionally used only by the file system. Therefore, with a journal log similar to the conventional one, the disk controller 3 in the storage system 2 cannot identify a storage area on the disk drive 4, where updated data is to be stored, using meta data included in the journal log. This means that, even if updated data is included in the journal log, flush processing cannot be executed by using the updated data. By contrast, the journal log in this embodiment includes the block address 53. The disk controller 3 uses a block address to execute input/output processing for a storage area on the disk drive 4. Therefore, if the journal log contains information on the block address 53 and an offset, the disk control processor 22 of the disk controller 3 can identify a storage area, where updated data is to be stored, using this information. In this way, the disk controller 3 can execute flush processing using updated data included in the journal log.

The journal log is provided to separately store a file update history in the storage system 2 because the contents of data updating executed in the buffer memory 13 of the server 1 may be lost because of a failure before data is updated in the storage area in the storage system 2. Therefore, the journal log is not necessary once data is updated in the storage area of the storage system 2. In view of this, the embodiment is configured so that ordinary data input/output requests, flush requests, and journal log input requests sent from the server 1 to the storage system 2 can be distinguished. If the storage system 2 is able to distinguish among ordinary data input/output requests, flush requests, and journal log input requests received from the server 1, the disk controller 3 can store journal logs into the journal log storing area 24, not in the cache memory 25 where ordinary data is stored. The ability of the disk controller 3 to store journal logs separately from ordinary data prevents journal logs from removing data from the cache memory 25, increasing the cache memory hit ratio.

If the storage system 2 can distinguish between an input/output request for ordinary data and an input/output request for journal logs, the disk controller 3 is able to write ordinary data on the disk drive 4 but hold journal logs only in the journal log storing area 24 without writing it on the disk drive 4. This results in the reduction of the load of data transfer between the disk controller 3 and the disk drive 4. In addition, this configuration makes available a storage area on the disk drive 4, in which journal logs would otherwise be written, for use in storing ordinary data, thus increasing the utilization of the storage area on the disk drive 4. Alternatively, a storage area for storing journal logs may also be allocated on the disk drive 4 to prepare for a failure to allow the disk controller 3 to write journal logs on the disk drive 4.

In this embodiment, the server 1 and the storage system 2 use a special interface to send and receive an input/output request for writing journal logs, a flush request, and a flush processing completion notification. With this special interface, the server 1 and the storage system 2 identify an input/output request for writing journal logs and an input/output request for ordinary data such as a flush request.

Figure 4:
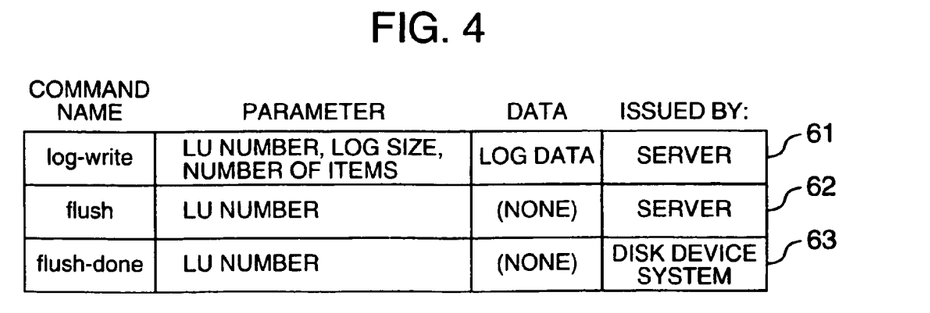
FIG. 4 is a diagram showing an example of commands used by a server and a disk controller.

FIG. 4 shows an example of interface commands used by the server 1 and the storage system 2 for sending and receiving an input/output request for writing journal logs, a flush request, and a flush processing completion notification. A command 61, a command issued from the server 1 to the storage system 2, writes a journal log. The command 61 is composed of a command name field indicating that the command is a journal log write request command, a parameter field containing journal log parameters, a data field containing the data part of the journal log, and a source field containing information identifying a server from which the command is issued. The parameter field contains an LU number indicating a logical unit in the disk drive 4 whose data is to be updated according to the update history included in the journal log, a log size indicating the size of log data, and the number of items included in the log data. The data field contains log data having the format of the data part 42 shown in FIG. 3. In response to the command 61, the journal log controller 34 of the storage system 2 allocates an area in the journal log storing area 24, creates a header based on the data included in the parameter field, and writes log data passed as the data.

A command 62, a flush request command issued from the server 1, is composed of a command name field indicating that the command is a flush request command, a parameter field containing a logical unit number, and a source field containing information identifying a server from which the command is issued. Because flush processing is executed in this embodiment using updated data included in the journal log as described above, data is not specified for the flush request command.

A command 63, a command issued by the storage system 2 to notify the server 1 of the completion of flush processing, is composed of a command name field indicating that the command is a flush processing completion notification command, a parameter field containing a logical unit number and an address within the journal log storing area to identify a journal log to be flushed, and a source field containing information identifying the storage system from which the command is issued. Data is not specified either for the command 63.

When the server issues a journal log write request or a flush request to the storage system using the command shown in FIG. 4, the storage system 2 checks the command name field to identify the journal log write request and the flush request.

Instead of providing special commands, a standard interface such as the SCSI may be used as the interface between the server 1 and the storage system 2. When the SCSI is used, the server 1 identifies the journal log write request and the flush request as follows. For example, the server 1 uses a vendor-unique command to issue the journal log write command, or the server 1 sets a flag in the command description block (CDB) of the write command before issuing the journal log write request. When those methods are used, the storage system 2 recognizes the vendor-unique command or the flag set in the CDB to identify the journal log write request and the flush request.

Alternatively, if the storage system 2 has a special device or a special storage area either on the disk drive 4 or in the cache memory 25 as the journal log storing area 24 and if the storage system 2 manages the device or the storage area separately from other devices or storage areas, a request to write into the journal log storing area 24 that is accepted from the server may be regarded as the journal log write request.

For the flush request issued from the server 1 to the storage system 2 and for the flush processing completion notification request issued from the storage system 2 to the server, the server 1 and the storage system 2 may also use a vendor-unique SCSI command or a command with a flag set in the CDB to distinguish the flush request and the flush processing completion notification from other commands.

Figure 5:
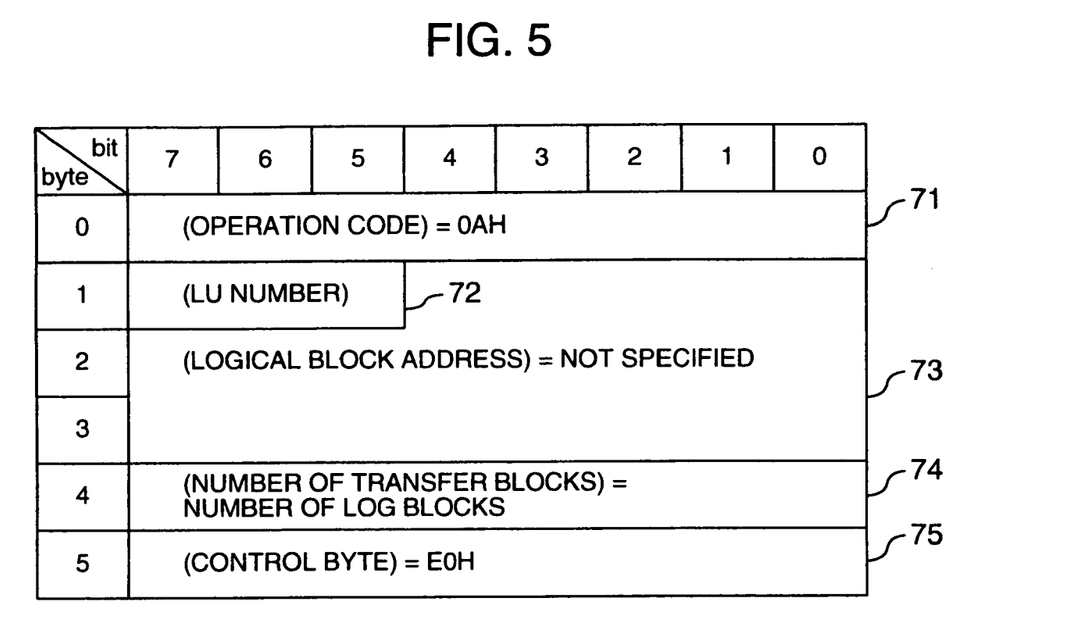
FIG. 5 is a diagram showing an example of a SCSI command used for a journal log write request.

With reference to FIG. 5, an example in which the server 1 sets a flag in the CDB will be described as an example of sending the journal log write request via the SCSI interface. FIG. 5 shows an example of the command description block (CDB) sent from the server 1 to the storage system 2 to issue the journal log write request. The hexadecimal number 0A is set in an operation code 71 of the CDB to indicate that the command is a write command. The journal log block size, expressed in blocks, is set in a number of transfer blocks 74. A value, for example, E0, predetermined by the server 1 and the storage system 2 to indicate that the command is a journal log write command is set in a control byte 75. Because the journal log controller 34 allocates an area in the journal log storing area 24 for writing the journal log therein, no value is set in a logical block address 73 specifying a storage area in which data is to be written. The storage system 2 examines the control byte 75 of the CDB to check whether or not the write command is a journal log write request. Following the CDB, the journal log including the header 41 and the data part 42, shown in FIG. 3, is sent from the server 1 to the storage system 2 as the data of the write command.

In another embodiment, an ordinary data input/output request, a journal log input request, and a flush request may be sent via the same interface. In this case, because the storage system 2 cannot distinguish the journal log write request from other input/output requests, a journal log is written also on the disk drive on which ordinary data is written. However, if the server specifies a storage area, where the journal log to be flushed is stored, for the flush request when the server issues the flush request, the storage system 2 can execute flush processing using updated data included in the specified journal log.

Figure 6:
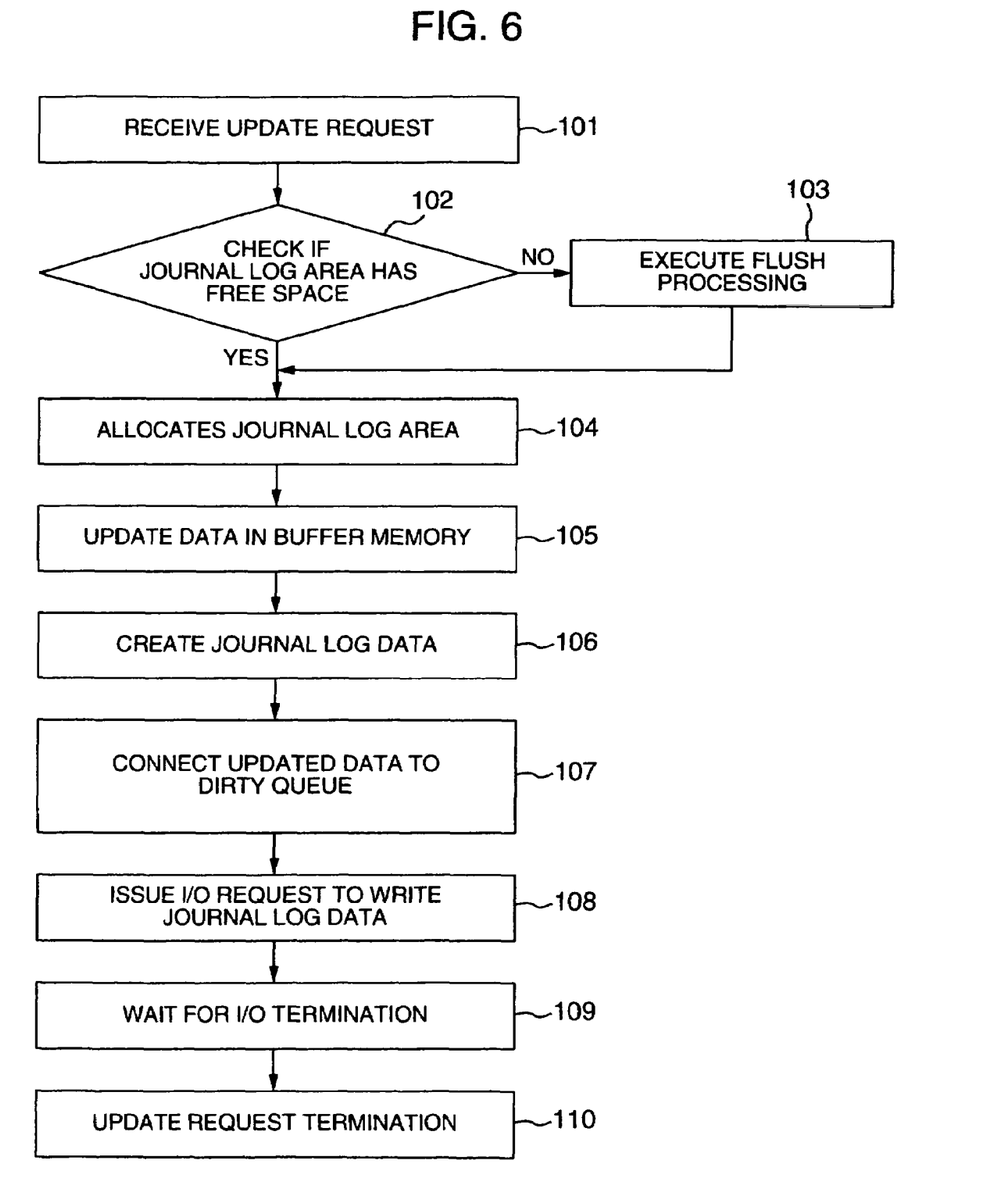
FIG. 6 is a flowchart showing an example of an operation procedure executed by a file system manager to update a file.
Figure 7:
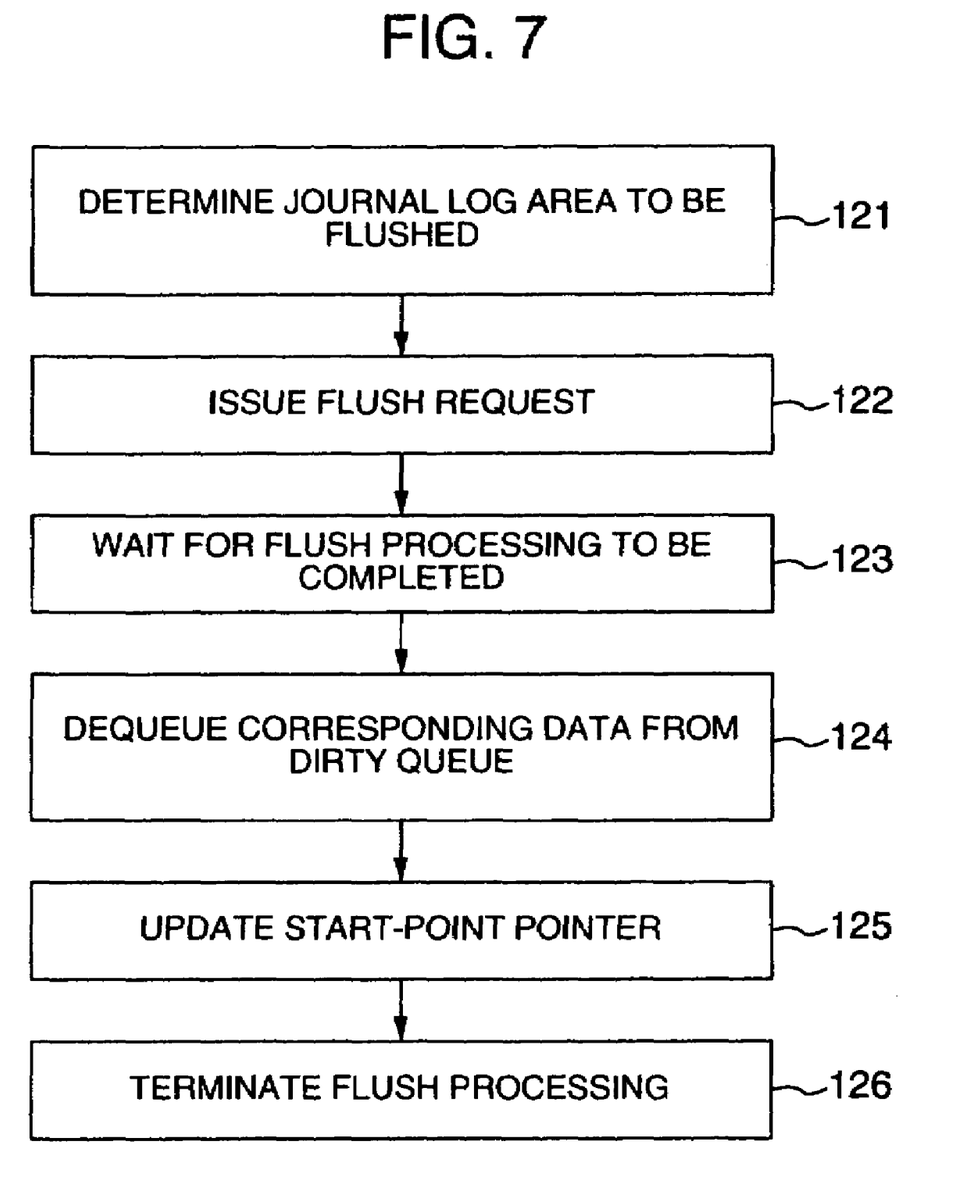
FIG. 7 is a flowchart showing an example of an operation procedure executed by a file system manager to execute flush processing.

FIG. 6 is a flowchart showing the operation of the file system manager 12 when the server 1 receives a request to update a file stored on the disk drive 4. In step 101, the file system manager 12 receives an update request via the operating system 11 or the network. In step 102, the file system manager 12 references the start-point pointer and the end-point pointer of the journal log storing area 24, which are managed in the buffer memory 13, to check if the journal log storing area 24 has free space into which updated contents are to be written. If there is free space, the file system manager 12 allocates an area of a required size as the journal log area for the update request in step 104 and then increments the end-point pointer in the buffer memory 13 by the size of the allocated area. If there is no free space, control is passed to step 103, where the file system manager 12 issues a flush request to the storage system 2 as shown in FIG. 7 and, after receiving a flush processing completion notification from the storage system 2, dequeues dirty data to create free space. In step 104, the file system manager 12 allocates a journal log area. Next, in step 105, the file system manager 12 updates data in the buffer memory 13 according to the update request and, in step 106, creates a journal log containing the update contents in the buffer memory 13. In step 107, the file system manager 12 connects updated data to the dirty queue to manage this updated data as dirty data for which update processing is not yet executed in the storage system 2. In step 108, the file system manager 12 issues an input/output request to the storage system 2 for writing the journal log. In response to this input/output request, the disk controller 3 writes the journal log into the journal log storing area 24 in the disk controller 3 under control of the journal log controller 34. That is, the journal log controller 34 writes the journal log beginning at the position within the journal log storing area 24 pointed to by the end-point pointer 44 and increments the end-point pointer 44 to the point immediately after the storage area in which the journal log has been written. After that, in step 109, the file system manager 12 waits for a journal log write completion notification to be received from the disk controller 3 and, after receiving the completion notification, returns an update processing completion response to the update requesting source in step 110.

FIG. 7 is a flowchart showing the processing procedure executed by the file system manager 12 when flush processing is executed. In step 121, the file system manager 12 references the start-point pointer and the end-point pointer of the journal log storing area 24, which are managed in the buffer memory 13, to determine a journal log in the journal log storing area 24 for which flush processing is to be executed. Next, in step 122, the file system manager 12 issues a flush request, for which a range within the journal log storing area 24 determined in step 121 is specified, to the storage system 2 and, in step 123, waits for a flush processing completion notification to be received from the storage system 2. In response to the completion notification from the storage system 2, the file system manager 12 dequeues data, which corresponds to data updated in the storage system 2 through the flush processing, from the dirty queue in step 124. In step 125, the file system manager 12 increments the start-point pointer 43, provided in the buffer memory 13 for managing the journal logs, to the last position at which flush processing was executed and then terminates flush processing in step 126.

FIG. 6 shows an example in which the server 1 issues a flush request when the journal log storing area 24 has no free space. Alternatively, the server 1 may issue a flush request at an interval or when the free space in the journal log storing area 24 falls below a predetermined amount. Also, as will be described later, when the file system manager 12 of the server 1 uses a plurality of dirty queues to manage dirty data, the server 1 may issue a flush request when the dirty queue is switched to an active dirty queue and, every time the flush request is issued, may release data from the corresponding dirty queue.

When flush processing is executed, the file system manager 12 may dequeue from the dirty queue only data corresponding to data that has been updated through flush processing in the storage area in the storage system 2. Therefore, the file system manager 12 must dequeue only dirty data corresponding to a journal log selected in step 121 for flush processing. To enable the file system manager 12 to identify dirty data to be dequeued, the server 1 stores in the buffer memory 13 the correspondence between journal logs and dirty data. Before dequeuing dirty data, the file system manager 12 searches for dirty data corresponding to a journal log selected in step 121 for flush processing and judges the dirty data as data to be dequeued.

Alternatively, the file system manager 12 may have a plurality of dirty queues. The file system manager 12 selects one of the plurality of dirty queues as an active dirty queue and, when data is updated in the buffer memory 13, connects the data to the active dirty queue (queuing). When a predetermined time has passed or a predetermined amount of data is updated in the buffer memory 13, the file system manager 12 makes another dirty queue active and makes the dirty queue, which has been active, non-active. As a result, only data that is updated while each dirty queue is active is connected to the dirty queue, and data that is updated after the dirty queue becomes non-active is connected to other dirty queues. For use in later dequeuing, when a dirty queue is switched from active to non-active, the file system manager 12 stores the journal log storage position corresponding to the dirty data connected to the end of this dirty queue (the position within the journal log storing area pointed to by end-point pointer when the dirty queue is switched from active to non-active). Then, when issuing a flush request, the file system manager 12 issues a flush request to the storage system 2 with the range of storage area to the stored pointer position specified. This flush request dequeues all data from the corresponding dirty queue when flush processing is completed.

If the server 1 requests the storage system 2 to execute flush processing for all un-reflected journal logs existing at the time the flush request is issued, the active dirty queue should be switched to another dirty queue when the file system manager 12 issues a flush request to the storage system 2.

In some cases, from the time flush processing is executed to the time the next flush processing is executed, the file system manager 12 accepts a request to update data stored in a particular area on the disk drive 4 two or more times. In such a case, when the file system manager 12 accepts the second or following data update request, dirty data to be reflected on this storage area should have already been enqueued to one of the plurality of dirty queues by the previously-accepted data update request. Therefore, the file system manager 12 must dequeue dirty data already enqueued to one of the plurality of dirty queues and then enqueues updated data specified by a new update request to the active dirty queue.

Figure 8:
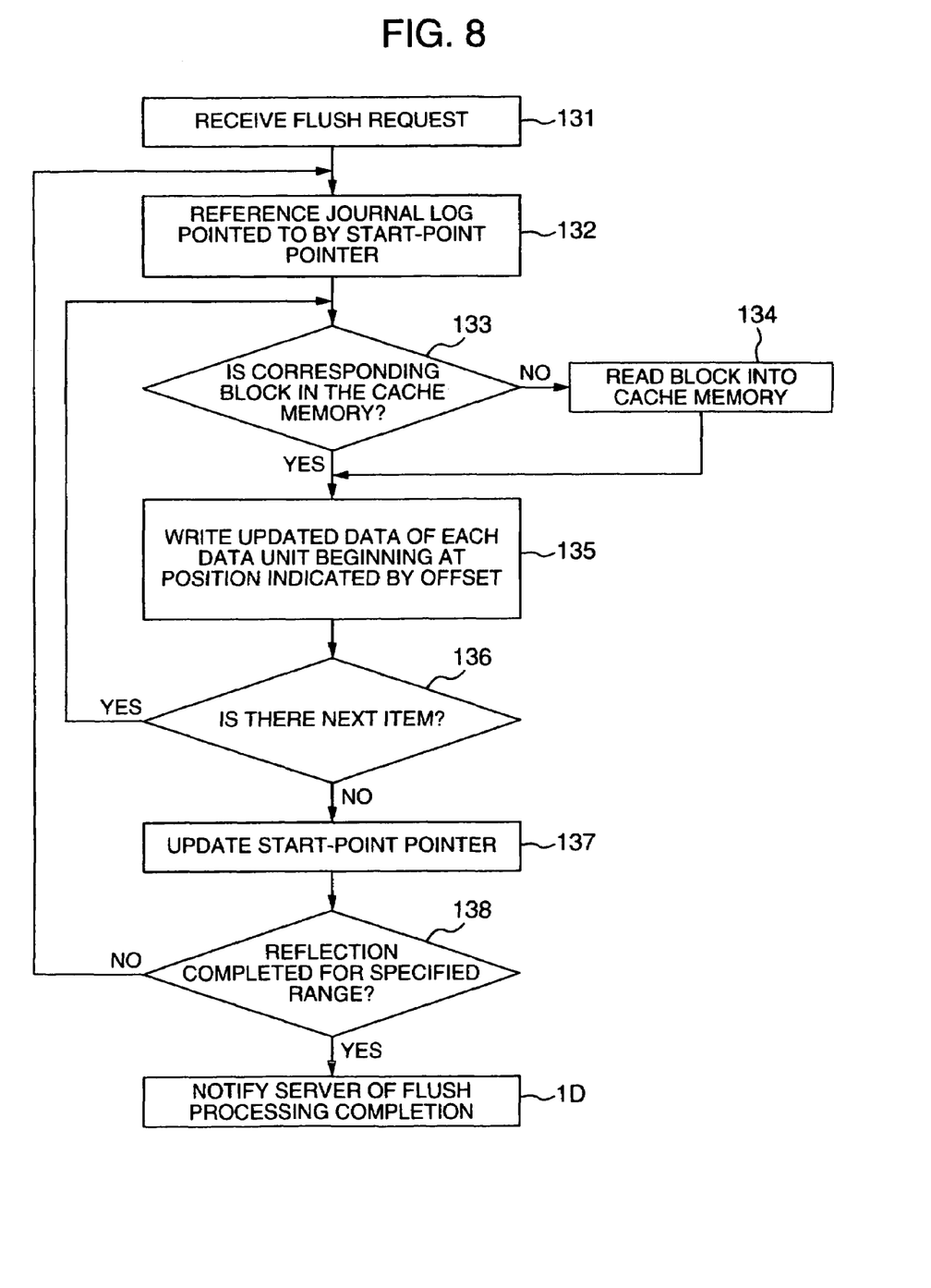
FIG. 8 is a flowchart showing an example of an operation procedure executed by a journal log manager to execute flush processing.

In the storage system 2 that has received the flush request issued by the server 1 in step 122, the journal log controller 34 executes flush processing using the journal log. FIG. 8 is a flowchart showing the flush processing procedure executed by the journal log controller 34 of the disk controller 3 that has received a flush request from the server 1. Upon receiving a flush request in step 131, the journal log controller 34 sequentially reflects the contents of the journal log on the cache memory 25, beginning at the position pointed to by the journal log management pointer to the area specified by the flush request.

The following describes how the contents of a journal log are reflected on the cache memory 25. First, in step 132, the journal log controller 34 references the journal log pointed to by the start-point pointer 43. In step 133, the journal log controller 34 checks the items 45 in the journal log if the data of the block specified by the block address 53 exists in the cache memory 25. If the data exists in the cache memory 25, control is passed to step 135. If the data does not exist in the cache memory 25, control is passed to 134 in which the journal log controller 34 allocates an area in the cache memory 25, reads into the cache memory the data of the block specified by the block address 53 included in the journal log from the disk drive 4, and passes control to step 135. In step 135, the journal log controller 34 writes the updated data 57 of each data unit included in the item 45, beginning at the position which is within the block read into the cache memory 25 and which is indicated by the specified offset 55. In step 136, the journal log controller 34 checks if another item 45 follows. If there is such an item, the journal log controller 34 passes control back to step 133 to check the next item 45 to see if the data of the block exists in the cache memory 25.

After updating all the items 45 in the journal log, control is passed to step 137 where the journal log controller 34 updates the start-point pointer 43 to the position of the next journal log. In step 138, the journal log controller 34 checks if the value of the start-point pointer 43 exceeds the range specified by the flush request in order to check if reflection processing has been completed for the specified range. If reflection processing has been completed, the journal log controller 34 sends a flush processing completion notification to the server 1 in step 139. After sending a flush processing completion notification, the updated data reflected on the cache memory 25 is written on the disk drive 4 under control of the disk drive controller 35. If reflection processing is not yet completed, control is passed back to step 132 where the journal log controller 34 references the journal log indicated by the start-point pointer 43 and reflects the journal log on the cache memory.

It is also possible that, before receiving a flush request, the journal log controller 34 updates data in the cache memory based on the journal log and then writes updated data on the disk drive 4. For example, when the number of input/output requests sent from the server 1 is small and therefore the load on the disk controller 3 is low, the journal log controller 34 executes processing, from step 133 to step 136 in FIG. 8, for the journal log indicated by the start-point pointer 43 and changes the start-point pointer 43 to point to the next journal log position. Updating data in the cache memory 25 based on the journal log before receiving a flush request in this manner reduces the number of journal logs to be reflected when the journal log controller 34 receives a flush request. This reduces the time required from the moment the journal log controller 34 receives a flush request to the moment the journal log controller 34 sends a flush processing completion notification to the server 1.

The journal log controller 34 may also update data in the cache memory 25 according to journal logs by writing the contents of a journal log into the cache memory 25 at the same time the storage system 2 receives an input/output request for writing the journal log from the server 1. The disk controller, which receives an input/output request for writing a journal log, executes the same processing as that shown in FIG. 8, which is usually executed when a flush request is received, for the journal log received from the server 1. Then, the disk controller returns a flush processing completion notification to the server in response to the input/output request for writing a journal log. According to this method, the disk controller 3 requires only a storage area, large enough to contain a journal log received by one input/output request for writing a journal log, as the journal log storing area 24, thus eliminating the need for managing an area for storing un-reflected journal logs using the start-point pointer 43 and the end-point pointer 44. Another advantage is that, because data is updated in the cache memory 25 each time the storage system 2 receives an input/output request for writing a journal log, the server 1 need neither to manage dirty data nor to issue a flush request.

Reflecting the contents of a journal log on the storage system 2 at the same time a journal log write request is received results in the poor response time of the input/output of the journal log write request. Especially, when journal log is reflected on the data stored in the cache memory, the response time is increased if data to be updated is not stored in the cache memory 25 because the data must be read from the disk drive 4 before it is updated. In view of this, when the disk controller 3 receives a journal log from the server 1 and stores it in the journal log storing area 24, the journal log controller 34 may first send a flush processing completion notification to the server before actually updating data in the cache memory based on the journal log. This method appears to the server 1 as if flush processing was executed at the same time the journal log was written in the storage system 2. In this case, the disk controller 3 must manage data, for which a flush processing completion notification has been sent to the server 1 but which is not yet actually updated in the cache memory, as dirty data. When a request to read dirty data is received from the server, the disk controller 3 first starts the journal log controller 34 to reflect the update contents, which are indicated by the un-reflected journal log, on the cache memory 25 and then sends the updated data to the server 1 in response to the read request.

As described above, a block address in the storage area where updated data is to be stored, if included in a journal log, allows the disk controller 3 to update the data in the cache memory using the updated data in the journal log and to store the updated data on the disk drive 4. This eliminates the need for updated data to be transferred from the server 1 to the storage system 2 when a flush request is issued, thus reducing the processing load on the server 1 and the storage system 2. In addition, the ability of the disk controller 3 to use updated data in a journal log makes it possible to write the updated data included in the journal log into the cache memory 25 in the disk controller 3 before the disk controller 3 receives a flush request from the server 1, resulting in a reduction of time required from the moment the server 1 issues a flush request to the moment the storage system 2 sends a flush processing completion notification to the server.

Furthermore, the disk controller 3 identifies a journal log write request and a flush request received from the server to prevent a journal log from being written on the disk drive. As a result, the processing load of data transfer between the disk controller 3 and the disk drive 4 may be reduced. Therefore, the server and the storage system may efficiently execute journal log write processing and flush processing.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:
   a server coupled to another server via a network; and
   a storage system coupled to said server;
   wherein said server comprises a buffer memory and a processor,
   wherein said storage system comprises:
      a plurality of disk devices;
      a journal log storage area; and
      a disk controller coupled to said disk devices;
   wherein said processor included in said server:
      receives an update request from said another server;
      updates data on said buffer memory; and
      sends a journal log to said storage system, said journal log being an update history information of updated data on said buffer memory and including both said updated data and a block address used to specify areas of one or more of said plurality of disk devices;
   wherein said disk controller included in said storage system:
      receives said journal log from said server;
      stores said journal log into said journal log storage area;
   wherein said processor sends a flush request to said storage system;
   wherein in response to said flush request, said disk controller:
      reads said journal log from said journal storage area;
      sends a flush processing completion notification to said server; and
      stores, into said one or more of said plurality of disk devices, said updated data included in said journal log using said block address; and
   wherein said processor manages said update data on said buffer memory as dirty data until receiving said flush processing completion notification from said storage system such that said processor, before receiving said flush processing completion notification from said disk controller, executes a process using said updated data on said buffer in response to receiving an access request from said another server.

2. The computer system according to claim 1;
   wherein said storage system further comprises a cache area;
   wherein when said disk controller receives a request from said server, said disk controller determines whether said received request is an I/O request or a journal log request based on a command name field included in said received request, and
   wherein, when said disk controller determines that said received request is a journal log request, said disk controller stores said received request into said journal log storage area,
   wherein when said disk controller determines that said received request is an I/O request, said disk controller accesses said cache area.

3. The computer system according to claim 1,
   wherein said plurality of disk drives configures one or more logical volumes,
   wherein said flush request includes one logical volume,
   wherein when disk controller receives said flush request to update the one logical volume, the disk controller specifies the journal log for updating the one logical volume corresponding to the flush request and controls update of the one logical volume using the journal log.

4. The computer system according to claim 1,
   wherein said disk controller is able to receive a plurality of journal logs from said server, the disk controller stores said plurality of journal logs into said journal log storage area in order said plurality of journal logs received from server.

5. The computer system according to claim 1,
   wherein said journal log includes a size information of the journal log, a plurality of updated data and a plurality of block addresses corresponding to each updated data.

* * * * *